April 29, 1958 G. J. REISCH 2,832,554
RESILIENT MOTOR MOUNTING
Filed March 31, 1955
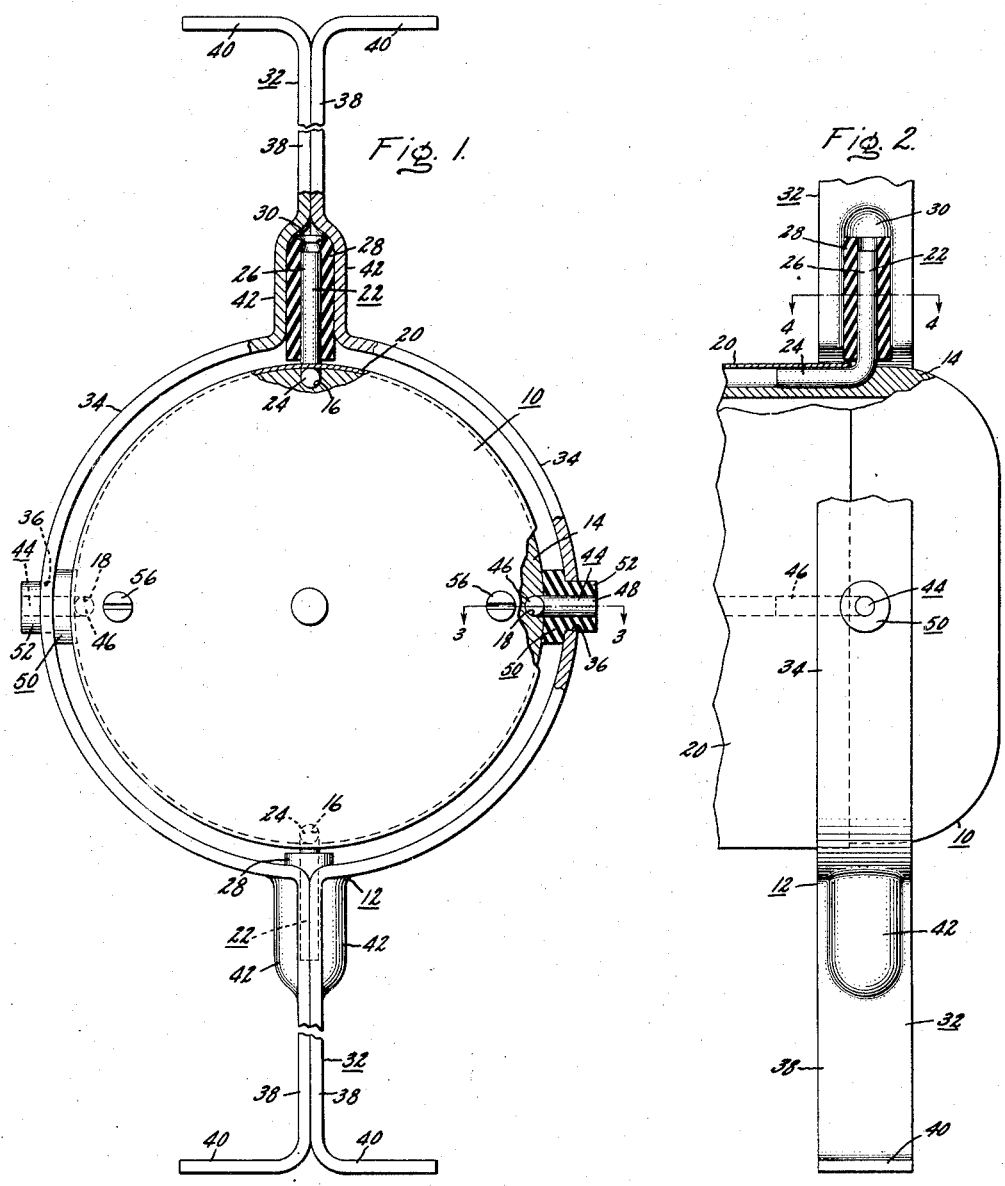
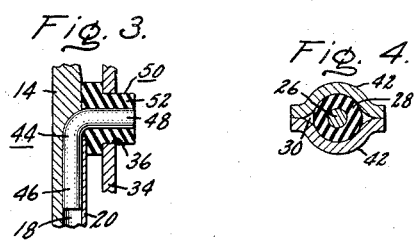
Inventor:
George J. Reisch,
by Armand Cifelli
His Attorney.

United States Patent Office 2,832,554
Patented Apr. 29, 1958

2,832,554

RESILIENT MOTOR MOUNTING

George J. Reisch, Milford, Conn., assignor to General Electric Company, a corporation of New York Application March 31, 1955, Serial No. 498,169

5 Claims. (Cl. 248—26)

This invention relates to a support and particularly to a resilient mounting for a motor or the like.

In many motor powered devices, particularly those which are used in homes and business offices, it is extremely desirable to minimize the undesirable effects due to vibration created by the motor. An example of a domestic appliance to which the foregoing applies is an electrical fan, wherein the problem of vibration is intensified due to the fact that the revolving fan blade produces a large amount of vibration in addition to that caused by the motor. Ordinarily the problem is most acute when the appliance is mounted on the floor or wall of a room in such a manner as to readily transmit vibrational forces from the appliance to the floor or walls of the room. In order to cope with this problem, the art has devoted considerable effort and energy to the end of providing various motor mountings which minimize the transmission of vibrational forces from the motor to the room structure. Many complicated and expensive arrangements have been devised, however, as will be readily appreciated, the cost of such mountings is often unjustified in many household appliances, due to the commercial competitiveness of this field.

It is an object of this invention to provide an effective resilient mounting for a motor or the like which is simple in construction, successful in operation, and low in cost.

The object of this invention is accomplished in one form by the utilization of formed straps which cooperate when assembled to provide a flexible mounting having means for receiving resilient members that are connected to and support a motor.

The above and other objects and further details of that which I believe to be novel and my invention will be clear from the following description and claims taken with the accompanying drawings wherein:

Figure 1 is a front elevational view of my improved motor mounting and a supported motor, having portions cut away and shown in section for the purpose of clarity.

Figure 2 is a fragmentary side elevation view of the Figure 1 construction having portions cut away and shown in section for clarity.

Figure 3 is a sectional view taken on line 3—3 of Figure 1.

Figure 4 is a sectional view taken on line 4—4 of Figure 2.

Referring to the drawings, and particularly to Figure 1, motor 10, which may be of any conventional type, is illustrated in position to be supported resiliently by the mounting 12. For the purposes of understanding the present invention, only a part of the motor structure need be described, its internal structure being conventional. The motor includes a casing 14 which has a plurality of axially disposed grooves spaced about the periphery of its outer surface, the vertically aligned grooves being designated 16 and the horizontally aligned grooves being designated 18. A plurality of mounting elbows, in the form of L-shaped rods, have one of their legs disposed in one of the respective grooves and retained therein by motor cap 20, which is mounted on the motor casing 14. The vertically aligned elbows are generally designated by the reference numerals 22, and each has a leg 24 disposed in an elongated cavity formed by a groove 16 and the motor cap 20, and the horizontally aligned elbows are generally designated by reference numerals 44, and each has a leg 46 disposed in an elongated cavity formed by a groove 18 and the motor cap 20. Each of the mounting elbows 22 has a vertically extending leg 26 that projects radially away from the motor 10 (as viewed in Figures 1 and 2, one leg 26 projects up and one down). Each leg 26 is received within a resilient, cylindrical tube 28, which is in turn supported in a cavity 30 formed in the motor mounting 12.

The motor mounting 12 comprises two identical, formed straps 32, each of which has an arcuate central portion 34 having a central opening 36 and generally flat arms 38 in the nature of straight extensions at each end of the arcuate portion 34, which have bent mounting flanges 40 at their extremities. The arms 38 have bulbous protuberances in the nature of embossments 42 for providing concave surfaces near the arcuate portion 34 of the strap. When the straps 32 are juxtaposed as illustrated in Figure 1, it will be seen that the arcuate portions 34 cooperate to form a general circular opening or ring for the reception of the motor 10, and that the concave surfaces of embossments 42 cooperate to form a pair of vertically aligned cavities 30, which receive the aforementioned resiliently encased legs 26. From the foregoing, it will be observed that the cavities 30 receive the resiliently encased legs 26 of the mounting elbows 22 and thereby resiliently mount the motor, but restrain substantial horizontal movement thereof.

In order to restrain substantial vertical movement of the motor, each of the horizontally aligned mounting elbows 44 has a leg 48 extending horizontally and radially away from the motor 10 and disposed in a resilient bushing 50, which in turn has a cylindrical portion 52 received in one of the openings 36. It will thus be seen that the motor 10 is supported by the two vertically aligned elbows 22 and the two horizontally aligned elbows 44, and that the overall effect of the mounting elbows is to restrain all substantial movement of the motor 10, but to provide a resilient mounting for it. The resilience is accomplished, first, in that the arms 38 are flexible and, second, by the resilient sleeves 28 and resilient bushings 50 which resiliently suspended the motor from the ring formed by the straps. It will be understood that the straps 32 may be rigidly secured to each other, preferably by their arms 38, in any conventional manner, and that the mounting flanges 40 may be secured to an appliance housing or the like in any conventional manner. In order to permit removal or replacement of the motor, the motor cap 20 may be removably secured to the motor casing 14 by conventional threaded members 56.

As will be evident from the foregoing description, certain aspects of my invention are not limited to the particular details of construction of the example illustrated, and I contemplate that various and other modifications will occur to those skilled in the art. It is, therefore, my intention that the appended claims will cover such modifications and applications as do not depart from the true spirit and scope of my invention.

What I claim as new and desire to secure by Letters Patent of the United States is:

1. A resilient motor support comprising a pair of elongated straps, each of said straps having a central arcuate portion and a straight portion extending from each of said arcuate portions, said straps being secured to each other with their respective straight portions in contact with each other, concave surfaces formed in each of said straight portions adjacent to said arcuate portions, said concave surfaces of one of said straps facing the concave surfaces of the other of said straps to define a pair of aligned cavities, motor supporting means positioned in each of said cavities, and said arcuate portions being disposed to form a ring for receiving a motor.

2. A device as defined in claim 1 wherein said motor supporting means includes a leg encased in a resilient sleeve.

3. A device as defined in claim 2 wherein each of said arcuate portions includes an opening which receives additional motor supporting means.

4. A device as defined in claim 3 wherein said additional motor supporting means includes a leg encased in a resilient sleeve and disposed in said openings.

5. A resilient support comprising a pair of elongated straps, each of said straps being formed with a central, arcuate portion, straight portions extending from the arcuate portion, said straps being secured to each other with their respective straight portions in contact with each other, concave surfaces formed in each of said straight portions adjacent to said arcuate portions, said concave surfaces of one of said straps facing the concave surfaces of the other of said straps to define a pair of aligned cavities, motor supporting means positioned in each of said cavities, said arcuate portions disposed to generally form a ring for receiving a motor, and an opening in each arcuate portion for receiving additional motor supporting means.

References Cited in the file of this patent

UNITED STATES PATENTS

| | | |
|---|---|---|
| 1,761,752 | Scott | June 3, 1930 |
| 1,834,674 | Bates | Dec. 1, 1931 |
| 2,115,569 | Brown | Apr. 26, 1938 |
| 2,451,970 | Odor | Oct. 19, 1948 |
| 2,700,500 | Wren | Jan. 25, 1955 |

FOREIGN PATENTS

| | | |
|---|---|---|
| 519,250 | Germany | Feb. 26, 1931 |